Jan. 12, 1932.  H. J. LEBHERZ  1,840,400
SUPPORT
Filed March 28, 1930
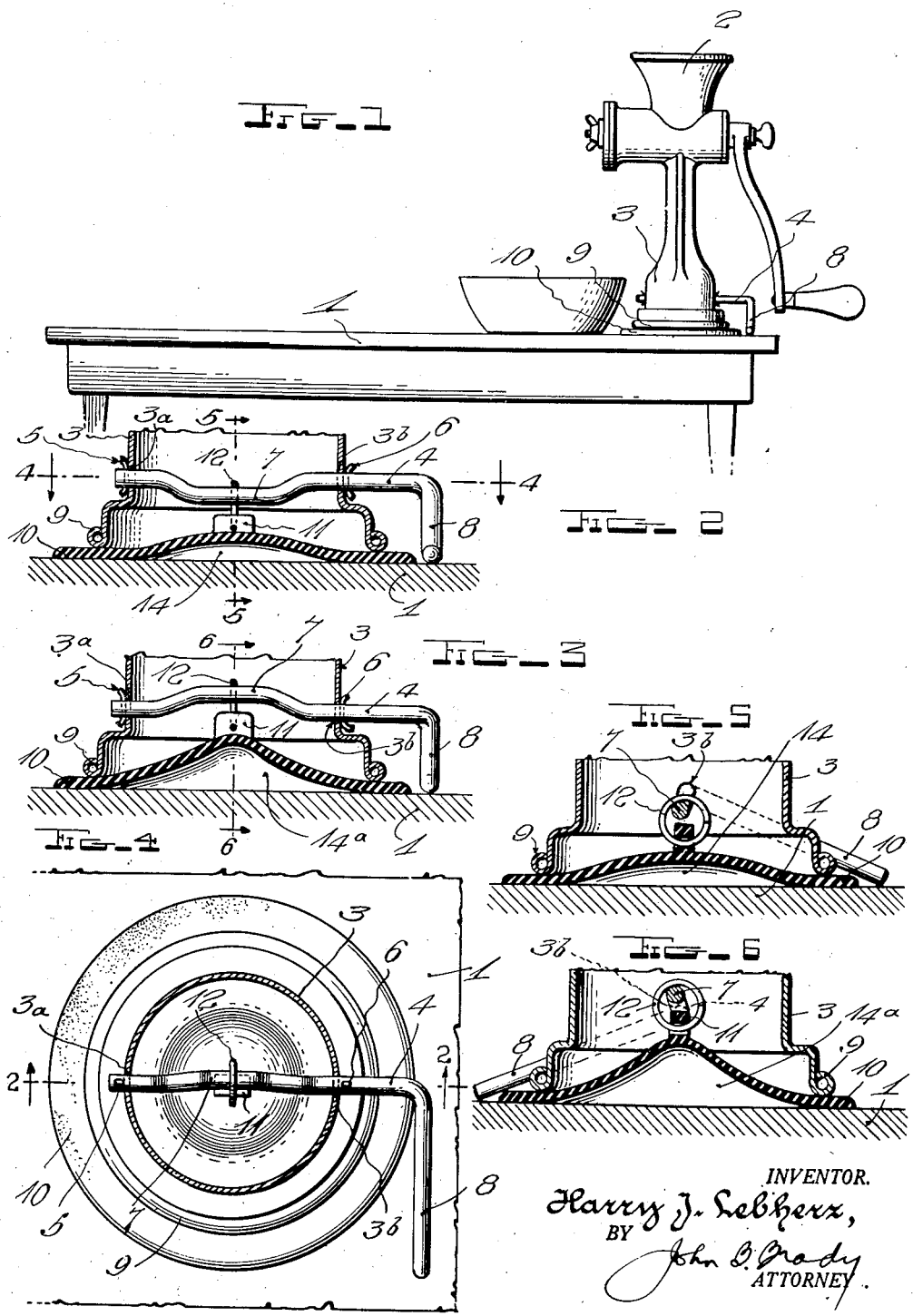
INVENTOR.
Harry J. Lebherz,
BY
John B. Grady
ATTORNEY.

Patented Jan. 12, 1932

1,840,400

UNITED STATES PATENT OFFICE

HARRY J. LEBHERZ, OF FREDERICK, MARYLAND, ASSIGNOR TO THE EVEREDY COMPANY, OF FREDERICK, MARYLAND, A CORPORATION OF MARYLAND

SUPPORT

Application filed March 28, 1930. Serial No. 439,698.

My invention relates broadly to attachments for securing various articles in position with respect to a supporting surface and more particularly to a supporting device operating by the principle of suction.

One of the objects of my invention is to provide a construction of suction support having actuating means for securing an article in position under control of the suction support.

Another object of my invention is to provide a construction of suction supporting device for attachment to a flat surface in which a mechanical actuator is provided for operating a suction diaphragm within the device for establishing sufficient pressure for retaining an article in position with respect to the flat surface.

A further object of my invention is to provide a simplified construction of suction locking device for retaining an article in position on a flat surface in which a mechanical actuator is employed, which actuator may be shifted to a position over a dead center to prevent accidental displacement of the actuator so long as the suction device is to be retained while permitting the quick removal of the suction device from the supporting surface.

Other and further objects of my invention reside in the construction of a suction diaphragm device having means for establishing a predetermined suction pressure for securing an article with respect to a flat supporting surface wherein the means is readily releasable as will be fully understood from the specification hereinafter following by reference to the accompanying drawings, in which:

Figure 1 is an elevational view showing the attachment of my invention employed for the support of a meat chopper on the surface of a kitchen table; Fig. 2 is a fragmentary cross-sectional view taken through the supporting device of my invention on line 2—2 of Fig. 4, and showing the diaphragm of the supporting device released preparatory to the attachment of the support to the plane surface; Fig. 3 is a cross-sectional view taken through the suction attaching means showing the supporting device secured in position with respect to a plane surface; Fig. 4 is a cross-sectional view through the supporting device taken on line 4—4 of Fig. 2; Fig. 5 is a cross-sectional view on line 5—5 of Fig. 2; and Fig. 6 is a cross-sectional view on line 6—6 of Fig. 3.

Heretofore in the attachment of various forms of culinary devices useful in the kitchen of the home, it has been usual to use a screw clamp for gripping an edge of the table. The edge of the table often projects for so short a distance over the side of the table that it is impossible to obtain a proper grip for such a clamp. The clamp often injures the edge of the table, particularly when the surface thereof may be of glazed porcelain. An object of my invention is to provide a construction of supporting device which is attachable to any plane surface for securing culinary equipment and other articles in a position upon a table or other flat surface without injury to the surface and with sufficient rigidity to permit the culinary equipment to be operated under its normal conditions. I provide a flexible suction diaphragm which may engage the surface of a table beneath the supporting structure. An actuator having an eccentric formed thereon is passed through the supporting structure and engages the central portion of the suction diaphragm. Normally the suction diaphragm is placed in direct contact with the surface of the table and is free to be moved to a selected position thereon. When the desired position is obtained the actuator is revolved thereby raising the center of the suction diaphragm and creating a vacuum beneath the suction diaphragm whereby atmospheric pressure directed upon the outside surface of the diaphragm is greater than the pressure beneath the diaphragm, as a result of which the support is maintained in position under normal pressure of the atmosphere. The actuator is so formed that when in actuated position it is on a dead center so that the supporting device tends to remain in rigid position under the pressure of the atmosphere.

I also make use of the dead center position of the actuator in initially mounting the supporting device in position upon a plane surface so that in one position on dead center the actuator is pressed for operation to secure the support to a flat surface while in the other position of the actuator a vacuum is established for retaining the support in position with respect to the flat surface.

In referring to the drawings in more detail, reference character 1 designates the surface of a table on which the culinary apparatus designated at 2 is adapted to be mounted. For purposes of illustrating my invention I have shown the culinary apparatus as consisting of an ordinary meat chopper having a base member 3 through which there extends the angularly movable actuator shaft 4. The actuator shaft passes through apertures 3a and 3b in the opposite side walls of the base 3 and is located in definite position therein by pin members 5 and 6. The actuator 4 is offset in the center of the supporting base 3 in the manner illustrated at 7. The actuator terminates in an angularly disposed actuating arm shown at 8. The base 3 is provided with a rolled edge 9 at the lower extremity thereof and beneath this base there extends a resilient diaphragm 10 having a diameter larger than the diameter of the base of the support 3 at the rolled edge 9. The diaphragm 10 has an upwardly protruding portion 11 at the center thereof which is apertured for the passage of a ring member 12 therethrough. The ring member 12 has a diameter sufficiently large to permit the eccentric 7 of the actuator shaft 4 to be passed therethrough as illustrated and moved through an angle of more than 180° in the process of raising or lowering the diaphragm 10 at its center. In Figs. 2 and 5 the diaphragm 10 is shown in released positon and arm 8 of the actuator shaft 4 has been moved in a clockwise position when moved at the base in the direction of the arrows 5 in Fig. 2. It will be observed that the actuator shaft is on dead center in the released position, that is the arm 8 has dropped to a limiting position and the eccentric position 7 of the actuator shaft 4 is off center with respect to the center line of shaft 4. The resilient diaphragm 10 is loose with respect to the base 1 and the space 14 beneath the diaphragm is equalized in pressure with the atmospheric pressure. When it is desired to secure the supporting base in position the arm 8 is shifted in a counterclockwise direction from the positions illustrated in Figs. 2 and 5 to the positions illustrated in Figs. 3 and 6. The eccentric 7 has been raised and engages ring 12 exerting an upward force thereon which stretches the resilient diaphragm 10 through the medium of the connecting portion 11 thus enlarging the area beneath the diaphragm 10 from the area 14 to the area 14a. Inasmuch as the same quantity of air is retained beneath the diaphragm 10 because of the hermetic seal established along the periphery of the diaphragm 10 with respect to the supporting surface 1, the condition of the air beneath the diaphragm 10 is rarefied. Inasmuch as the volume 14a is increased with respect to the volume 14 the pressure beneath the diaphragm in Figs. 3 and 6 decreases, inasmuch as under equal temperature the product of pressure and volume is a constant.

It will be observed that the position of the actuating lever 4 in Figs. 3 and 6 is one wherein the arm 8 again rests on a dead center inasmuch as the eccentric 7 is moved out of alignment with the axis of actuating shaft 4. Having created a partial vacuum beneath the diaphragm 10, the support is retained in rigid position. When it is desired to remove the support from the surface the arm 8 is thrown in a clockwise direction from the position shown in Figs. 3 and 6, releasing the diaphragm 10 which by virtue of its resilient properties returns to normal position thereby destroying the partial vacuum which heretofore existed beneath the diaphragm.

In Fig. 4 the actuating lever has been shown in position wherein the diaphragm 10 is released, that is in the initial position corresponding to the positions illustrated in Figs. 2, 4 and 5.

The attachment of my invention may be rigidly operated to secure the support in position upon a supporting surface. I have found the device of my invention highly practical and simple in its construction. In order to improve the hermetic sealing properties between the lower surface of the resilient diaphragm 10 and the supporting surface 1, I may apply moisture to the lower surface of the resilient diaphragm 10 thereby increasing the securing properties of the device.

While I have described my invention in one of its preferred embodiments I desire that it be understood that modifications may be made and that no limitations upon my invention are intended other than are imposed by the scope of the appended claims.

What I claim as new and desire to secure by Letters Patent of the United States is as follows:

1. A support comprising a base member attachable to a flat surface, a resilient diaphragm having a diameter larger than the diameter of said base member, said diaphragm being engageable with the flat surface adjacent said support, a lug portion projecting outwardly from the central upper portion of said diaphragm, said lug portion being apertured, an actuating shaft extending through said base member, an arm connected with said actuating shaft outside of said base member, said arm being shiftable to either of two positions through an angle of more than 180°, an eccentric carried by said actuating shaft, a ring member passing through the aperture of said lug portion of said diaphragm and enclosing said eccentric whereby movement of said arm to one limiting position operates said eccentric for distorting said diaphragm out of normal position for creating a partial vacuum between said flat surface and said diaphragm whereby said base member may be maintained in position under the effects of atmospheric pressure.

2. In a support for maintaining a base member in a predetermined position with respect to a flat surface, a base member, a resilient diaphragm closing the end of said base member and directly engageable with the flat surface therebeneath, a lug portion projecting outwardly from the central upper portion of said diaphragm, said lug portion being apertured, an angularly movable actuator shaft extending through said base member, an eccentric formed on said actuator shaft, a ring member passing through the aperture of said lug portion of said diaphragm and enclosing said eccentric, an arm connected with said actuator shaft exteriorly of said base member, said arm being movable to either of two limiting positions for shifting said eccentric to a dead center for distorting said diaphragm in one of the limiting positions and creating a partial vacuum between said flat surface and said diaphragm while restoring said diaphragm to normal position when said arm is shifted to the opposite limiting position thereof whereby said base member may be maintained in rigid position with respect to the flat surface.

3. A support comprising a base member, a resilient diaphragm closing the end of said base member and engageable with a flat surface, a lug portion projecting outwardly from the central upper portion of said diaphragm, said lug portion being apertured, an angularly movable actuating shaft extending through said base member, an eccentric formed on said actuating shaft, a ring member passing through the aperture of said lug portion of said diaphragm and enclosing said eccentric, an arm extending exteriorly of said base member and movable in a clockwise or counter-clockwise direction for shifting said eccentric to either of two dead center positions, said eccentric in one dead center position operating to stretch said diaphragm for creating a partial vacuum between said flat surface and said diaphragm and in the other dead center limiting position serving to restore said diaphragm to normal position.

In testimony whereof I affix my signature.

HARRY J. LEBHERZ.